Sept. 2, 1941. J. W. DECKER Re. 21,891

BROAD TAPE TICKER PROJECTING MACHINE

Original Filed Jan. 28, 1928 2 Sheets-Sheet 1

INVENTOR
James W. Decker,
BY Wilson Stokes
ATTORNEY S

Sept. 2, 1941. J. W. DECKER Re. 21,891

BROAD TAPE TICKER PROJECTING MACHINE

Original Filed Jan. 28, 1928 2 Sheets-Sheet 2

INVENTOR
James W. Decker
BY
Wm. Schenck
ATTORNEYS.

Reissued Sept. 2, 1941

Re. 21,891

UNITED STATES PATENT OFFICE 21,891

BROAD TAPE TICKER PROJECTING MACHINE

James W. Decker, New York, N. Y.

Original No. 1,932,399, dated October 31, 1933, Serial No. 250,162, January 28, 1928. Application for reissue February 12, 1940, Serial No. 318,652

16 Claims. (Cl. 88—24)

This invention relates in general to broad tape ticker projecting machines.

Among the objects of the present invention it is aimed to provide a combination broad tape ticker and projecting mechanism whereby an extended length of the broad tape ticker may be simultaneously projected throughout its entire width.

It is also an object of the present invention to provide a combination of broad tape ticker projecting machine and tape guides whereby the tape as it is delivered from the projecting machine may be fed into a suspended position, in which position it can be read after leaving the projecting machine.

It is still a further object of the present invention to provide in combination a broad tape ticker projecting machine and tape drawing mechanism whereby the tape drawing mechanism will function to draw the tape a line space immediately after the broad tape ticker has fed the tape a line space.

Specifically, the invention contemplates the provision of an improved tape drawing mechanism for a ticker tape projecting machine embracing an electric motor and an electric switch for controlling the motor.

These and other features, capabilities and advantages of the invention will appear from the subjoined detail description of one specific embodiment thereof illustrated in the accompanying drawings in which Figure 1 is a transverse section showing an end elevation of the ticker and lamp housing;

Figure 1:
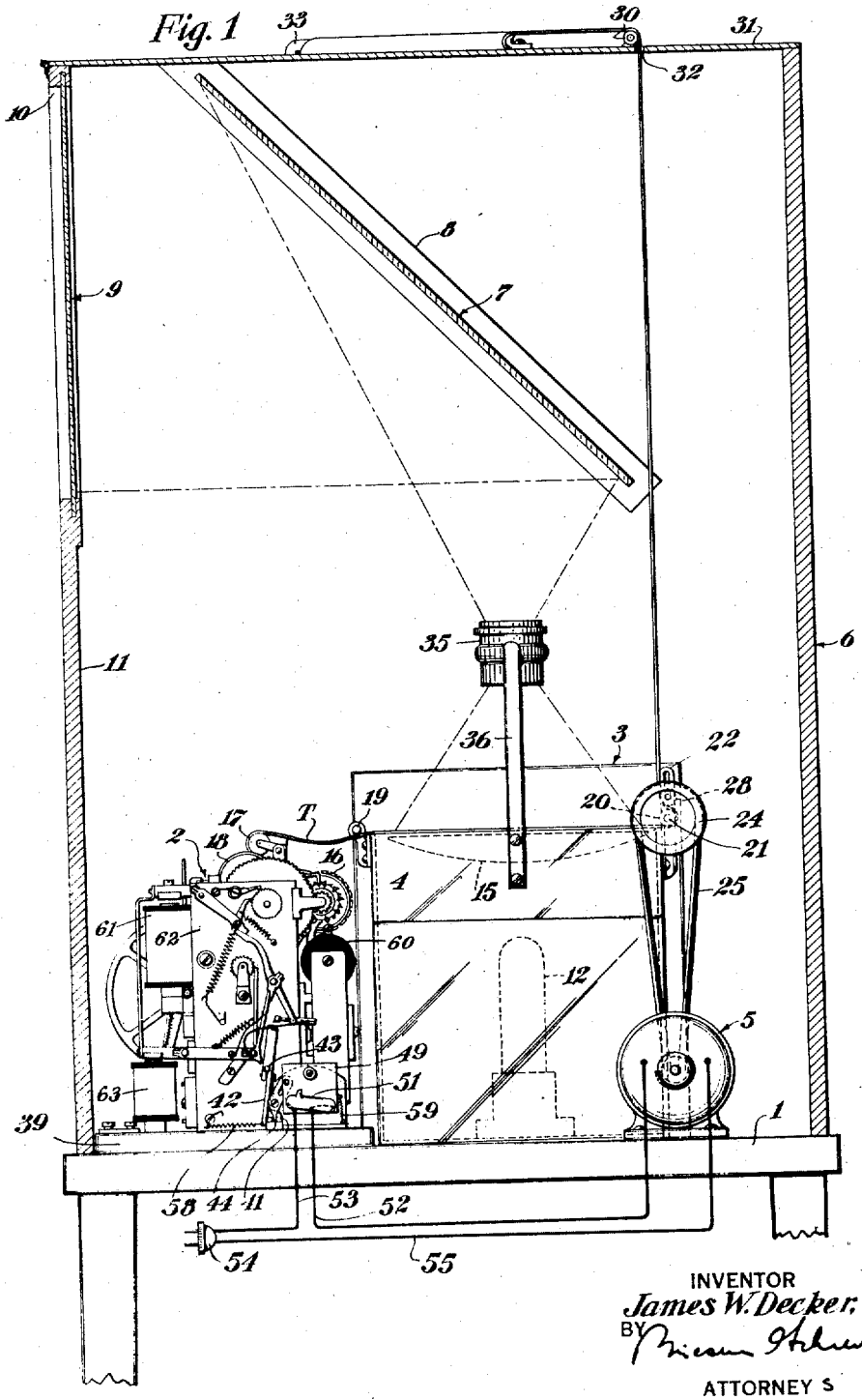

In the embodiment illustrated, there is provided a frame having a platform 1 on which there is supported a broad tape ticker 2 of the type illustrated in Patent No. 680,693 to John Burry. To one side of the broad tape ticker 2 there is supported a lamp housing 3 having a lateral extension 4. On the platform 1 there is also supported an electric motor 5.

In the present instance, the ticker 2, lamp housing 3 and electric motor 5 are all enclosed in a housing 6 which is provided with a mirror 7 supported in the frame 8 secured to the housing 6, said mirror 7 being disposed at an angle to the screen 9 formed in the opening 10 at the upper end of the front wall 11 of the housing 6.

Figure 2:
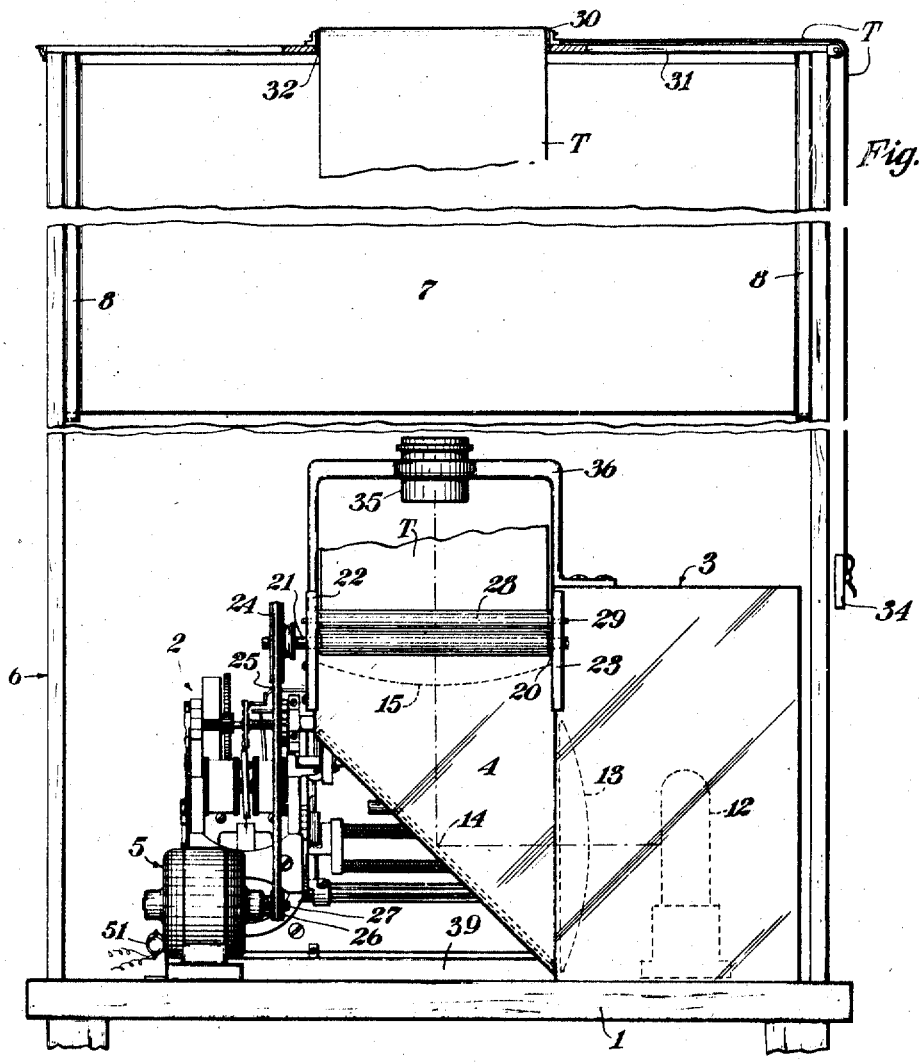
Fig. 2 is a rear elevation of the device partly broken away.

The lamp housing 3, as illustrated in Fig. 2, is provided with a lamp 12, the light rays of which are received by the lens 13 and directed to the deflector 14 disposed at an angle to the lens 13 from which the light rays are projected upwardly through the lens 15 extending across the light aperture at the upper end of the extension 4.

The broad tape T receives printing impressions from the printing mechanism 16 of the ticker 2, after which it passes to the feeding mechanism 17, 18, after which the tape is bent back upon itself and passes under the idler 19 formed at the upper front end of the extension 4, and then passes across the lens 15 or light aperture to the positively driven feed roller 20 located at the rear upper end of the extension 4. The roller 20 is fixed on a shaft 21, the ends of which are journaled in the brackets 22 and 23 extending from the rear upper end of the extension 4. One end of the shaft 21 has fixed thereon the sheave 24 which is connected by the belt 25 with the sheave 26 mounted on the shaft 27 of the motor 5.

Above the roller 20 is provided the idle roller 28 mounted on the shaft 29, the ends of which are journaled in the upper ends of the brackets 22 and 23 and preferably yieldably spaced from the roller 20 to exercise a feeding pressure on the tape T as it passes over the roller 20 and under the roller 28 up to the idler 30 formed on the roof section 31 of the housing 6. The tape, as shown in Fig. 1, passes through the opening 32 formed in the roof section 31 before passing over the idler 30. From the idler 30, the tape passes over to the guide bar 33 disposed substantially at an angle of forty-five degrees to the idler 30, over which guide bar 33 the tape passes and then extends down along one side of the housing 6, see Fig. 2. The tape T has preferably attached thereto a weight 34 as shown in Fig. 2, to exercise a downward tension on the suspended portion of the tape T.

The light rays passing through the portion of the tape disposed on the light aperture, pass upwardly to the lens supported in the housing 35 which is supported above the light aperture by means of the bracket 36 which extends over from the housing 3 to the end of the extension 4. From the lens disposed in the housing 35, the light rays are projected onto the deflecting member or mirror 7 from which the light rays and images of the configurations on the tape T are projected onto the screen 9.

The drawing roller 20 is actuated to impart a drawing action on the tape T only intermittently, that is, to correspond with the line spacing of the ticker 2. In other words, the broad tape ticker feeds the tape a line space after the completion of a line of printed matter and then rests while the ticker proceeds to print a line. In order to control this intermittent action, the present invention provides an electric switch, see Fig. 3, which has a lever 37 pivotally mounted on the block 38 preferably supported on the ticker platform 39 mounted on the table 1. The lever 37 is pivotally movable about a vertical pivot, and has a short arm 40 and a bifurcated long arm 41. The short arm 40 extends into the path of movement of the extended lever portion 42 of the ticker 2, which extended lever portion 42 forms a part of the line spacing mechanism of the ticker 2 and is actuated to rock about the pivot 43 of the ticker 2 with the actuation of the line spacing mechanism. The pivot 43 constitutes the shaft in the Burry ticker disclosed in Patent No. 680,693, which is only actuated as the result of a line signal effective to interrupt the circuit through escapement magnets including the magnet 60 while the circuit through magnets including the magnet 61 is kept closed whereupon the parts at the near side of the plate 62, which are operated by another group of magnets including the magnet 63, return to the position required in which the apparatus is ready to release the type wheel 16 and other parts to permit the type wheel 16 to return to the left and the paper to be fed forward one line space. As will clearly appear from the Burry patent aforesaid, the paper will be fed forward one line space during the interval in which the type wheel 16 is being returned to the left, as the result of a line signal as aforesaid.

As clearly set forth in the Burry patent, when a line signal, that is a code signal as is conventional with such electric printers, is transmitted to effect a printing impression, a group of magnets will now be energized, including the magnet 61 which was kept closed during the transmission of the line signal to effect a line space feed of the tape. The bifurcated arm 41 engages the finger 44 of the lever 45 pivotally mounted on the bracket 46, also mounted on the ticker platform 39.

The lever 45 is provided with a slot 47 to receive the pin 48 in the bracket 49 pivotally mounted at 50 to the bracket 46. On the bracket 49 is supported the tube 51 containing the liquid mercury 51*a* of a mercury switch. The tube 51 has one conductor 52 extending therefrom and connecting it with the motor 5, and another lead 53 connecting the tube 51 with the outlet plug 54, which outlet plug 54 is provided with a conductor 55 connecting it with the motor 5.

Figure 3:
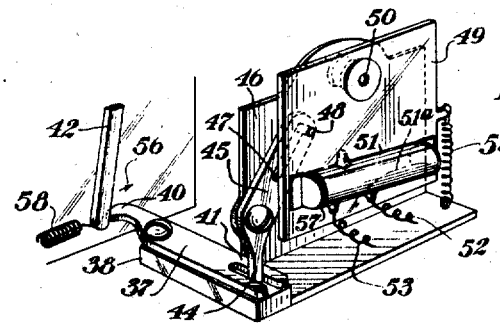
Fig. 3 is a fragmental perspective showing the electric switch.

In the operation of the device, when the line spacing mechanism of the ticker 2 operates actuating the arm 42 in the direction of the arrow 56 indicated in Fig. 3, the lever 37 will be actuated in turn to actuate the lever 45, in turn to rock the bracket 49 to cause the end 57 of the tube 51 to be depressed, thereby causing the mercury 51*a* to flow across the contacts of the conductors 52 and 53 to make contact, thereby causing the electric motor 5 to be operated, in turn to actuate the drawing roller 20, whereupon a drawing action will be imparted to the tape T to draw the same across the light aperture of the extension 4. As soon as the tape has been advanced a line space by the ticker 2, the arm 42 will be returned by its spring 58, whereupon the spring 59 will be free to actuate the bracket 49 again to raise the end 57 of the mercury switch to break the contact and cause the motor 5 to come to rest. Thereupon of course, the tape drawing roller 20 will come to rest. The actuation of the tape drawing roller 20, it will be seen from the foregoing, is only caused to impart a drawing action on the tape T after the tape is advanced a line space by the ticker 2.

It is obvious that various changes and modifications may be made to the details of construction without departing from the general spirit of the invention as set forth in the appended claims.

I claim:

1. The combination with a broad tape, of a ticker having a printing mechanism for printing on said tape and having a feeding mechanism for advancing the tape a line space after the completion of a line of printed matter, a lamp housing having an extension, a lamp in said lamp housing, a light aperture at the upper end of said extension, a deflector at the bottom of said extension for receiving the light rays from said lamp and projecting them upwardly through said light aperture, tape drawing means for drawing the tape from said ticker across said light aperture, and means operatively connected to said feeding mechanism for actuating said tape drawing mechanism intermittently to correspond with the line space advancing actuation of said ticker feeding mechanism.

2. The combination with a broad tape, of a ticker having a printing mechanism for printing on said tape and having a feeding mechanism for advancing the tape a line space after the completion of a line of printed matter, a lamp housing having an extension, a lamp in said lamp housing, a light aperture at the upper end of said extension, a mirror at the bottom of said extension for receiving the light rays in a path of movement at right angles to the path of movement of the tape and projecting the light rays upwardly at right angles to the plane of movement of said tape, tape drawing means for drawing the tape from said ticker across said light aperture, and means operatively connected to said feeding mechanism for actuating said tape drawing mechanism intermittently to correspond with the line space advancing actuation of said ticker feeding mechanism.

3. The combination with a broad tape, of a ticker having a printing mechanism for advancing the tape a line space after completing a line of printed matter, a lamp housing having a light aperture, tape drawing means for drawing the tape from said ticker across said light aperture, a housing having a screen, projecting means for receiving the images on the portion of tape located across said light aperture and projecting them to said screen, and a guide on the top of said housing for receiving the tape from said tape drawing means and guiding it into suspended position.

4. The combination with a broad tape, of a ticker having a printing mechanism for advancing the tape a line space after completing a line of printed matter, a lamp housing having a light aperture, tape drawing means for drawing the tape from said ticker across said light aperture, a housing having a screen, projecting means for receiving the images on the portion of tape located across said light aperture and projecting them to said screen, a guide on the top of said housing for receiving the tape from said projecting means and guiding it into suspended position, and tension means connected to the suspended portion of the tape to draw it across said guide.

5. The combination with a broad tape, of a ticker having a printing mechanism for printing on said tape lines of printed matter extending transversely of said tape and having a feeding mechanism for advancing the tape a line space after the completion of a line of printed matter, a light aperture sufficiently wide to receive at one time an area of said tape having a plurality of lines of printed matter, tape drawing means for drawing the tape from said ticker across said light aperture, actuating means independent of said ticker for actuating said tape drawing means, and means independent of said tape for operatively connecting said feeding mechanism to initiate the actuation of said actuating means when said feeding mechanism operates and to initiate the arrest of said actuating means when said feeding mechanism comes to rest.

6. The combination with a broad tape, of a ticker having a printing mechanism for printing on said tape lines of printed matter extending transversely of said tape and having a feeding mechanism for advancing the tape a line space after the completion of a line of printed matter, a light aperture sufficiently wide to receive at one time an area of said tape having a plurality of lines of printed matter, tape drawing means for drawing the tape from said ticker across said light aperture, an electric motor operatively connected to actuate said tape drawing means, an electric switch for controlling the actuation of said motor, and means independent of said tape for operatively connecting said switch with said feeding mechanism to actuate said switch into circuit making position when said feeding mechanism operates and again into circuit breaking position as soon as the line feed has been effected.

7. The combination with a broad tape, of a ticker having a printing mechanism for printing on said tape lines of printed matter extending transversely of said tape and having a feeding mechanism for advancing the tape a line space after the completion of a line of printed matter, a light aperture sufficiently wide to receive at one time an area of said tape having a plurality of lines of printed matter, tape drawing means for drawing the tape from said ticker across said light aperture, an electric motor operatively connected to actuate said tape drawing means, a mercury switch for controlling the actuation of said motor, and means independent of said tape for operatively connecting said mercury switch with said feeding mechanism to actuate said switch into circuit making position when said feeding mechanism operates and again into circuit breaking position as soon as the line feed has been effected.

8. The combination with a broad tape, of a ticker having a printing mechanism for printing in lines transversely on said tape and having a feeding mechanism for advancing the tape a line space at a time, a lamp housing having a light aperture sufficiently wide to receive at one time an area of said tape having a plurality of lines of printed matter, tape drawing means independent of said ticker for drawing the tape from said ticker across said light aperture, and means independent of said tape operatively connecting said feeding mechanism to initiate the actuation of said tape drawing means intermittently to correspond with the line space advancing actuation of said ticker feeding mechanism.

9. The combination with a broad tape, of a ticker, a lamp housing having a light aperture, tape drawing means for drawing the tape from said ticker across said light aperture, a housing having a screen, projecting means for receiving the images on the portion of tape located across said light aperture and projecting them to said screen, and a guide on the top of the housing for receiving the tape from said tape drawing means and guiding it into suspended position.

10. The combination with a broad tape, of a ticker, a lamp housing having a light aperture, tape drawing means for drawing the tape from said ticker across said light aperture, a housing having a screen, projecting means for receiving the images on the portion of tape located across said light aperture and projecting them to said screen, a guide on the top of said housing for receiving the tape from said projecting means and guiding it into suspended position, and tension means connected to the suspended portion of the tape to draw it across said guide.

11. The combination with a broad tape, of a ticker having a feeding mechanism for advancing the tape a line space at a time, a light aperture sufficiently wide to receive at one time an area of said tape having a plurality of lines of printed matter, tape drawing means for drawing the tape from said ticker across said light aperture, actuating means independent of said ticker for actuating said tape drawing means, and means independent of said tape for operatively connecting said feeding mechanism to initiate the actuation of said actuating means when said feeding mechanism operates and to initiate the arrest of said actuating means when said feeding mechanism comes to rest.

12. The combination with a broad tape, of a ticker having a printing mechanism for printing in lines transversely on said tape and having a feeding mechanism for advancing the tape a line space at a time, a light aperture sufficiently wide to receive at one time an area of said tape having a plurality of lines of printed matter, tape drawing means for drawing the tape from said ticker across said light aperture, an electric motor operatively connected to actuate said tape drawing means, an electric switch for controlling the actuation of said motor, and means independent of said tape for operatively connecting said switch with said feeding mechanism to actuate said switch into circuit making position when said feeding mechanism operates and into circuit breaking position when said feeding mechanism comes to rest.

13. The combination with a broad tape, of a ticker having a printing mechanism for printing in lines transversely on said tape and having a feeding mechanism for advancing the tape a line space at a time, a light aperture sufficiently wide to receive at one time an area of said tape having a plurality of lines of printed matter, tape drawing means for drawing the tape from said ticker across said ligh' aperture, an electric motor operatively connected to actuate said tape drawing means, a mercury switch for controlling the actuation of said motor, and means independent of said tape for operatively connecting said mercury switch with said feeding mechanism to actuate said switch into circuit making position when said feeding mechanism operates and into circuit breaking position when said feeding mechanism comes to rest.

14. The combination of a broad tape, a telegraphic printer including means for printing a plurality of successive lines of printed matter on said tape and including a line spacing control both in response to telegraphic code signals, means for drawing the tape through an illuminated area, a step by step line spacing actuator operatively associated with said drawing means, and means operatively connecting said actuator with said control to actuate said actuator in turn to feed the tape a line space at a time through said illuminated area.

15. The combination of a telegraphic printer including means for printing a plurality of successive lines of printed matter on a tape and including a line spacing control both in response to telegraphic code signals, means for drawing the tape through an illuminated area, a tape advancing actuator operatively associated with said drawing means to impart a line spacing advance to the tape with each actuation of said line spacing control, and means for operatively connecting said actuator with said control to actuate said actuator in turn to feed the tape a line space at a time through said illuminated area.

16. The combination of a broad tape, a telegraphic printer including means for printing a plurality of successive lines of printed matter on said tape and including a line spacing control, both in response to telegraphic code signals, means for drawing the tape through an illuminated area, a tape advancing actuator operatively associated with said drawing means to actuate said drawing means to advance the tape a line space after each operation of said control, and means for operatively connecting said actuator to actuate with said control in turn thereupon to feed the tape a line space at a time through said illuminated area.

JAMES W. DECKER.